United States Patent

[11] 3,617,805

[72] Inventor Robert L. Truax
Lauderhill, Fla.
[21] Appl. No. 15,486
[22] Filed Mar. 2, 1970
[45] Patented Nov. 2, 1971
[73] Assignee Dayton Aircraft Products, Inc.
Ft. Lauderdale, Fla.

[54] LOW-NOISE STATIC DISCHARGER DEVICE
10 Claims, 12 Drawing Figs.

[52] U.S. Cl. .................................. 317/2 E,
317/2 R
[51] Int. Cl. ................................. H05f 3/00
[50] Field of Search ......................... 317/2 R, 2
E, 2 F

[56] References Cited
UNITED STATES PATENTS
2,497,924 2/1950 Beach .......................... 317/2 E
2,536,818 1/1951 Lawton ....................... 317/2 E
3,034,020 5/1962 Benboczy et al. ............ 317/2 E Primary Examiner—William H. Beha, Jr.
Assistant Examiner—Harry E. Moose, Jr.
Attorney—Marechal, Biebel, French & Bugg ABSTRACT: A static discharging device for use on an aircraft includes a resistance element having one end electrically attached to the aircraft and a plurality of resistively separated metallic fibers of substantially constant diameter of 10 microns or less and a length of less than one-half inch attached to its other end. The resistance element is preferably a nylon substrate having a carbon-impregnated plastic coating thereon to provide a controlled resistance of 20 to 80 megohms over its length. A lightning diverter element may also be included with the static discharge device and includes a separate semiconductive strip on which may be placed a plurality of spaced-apart aluminum disks which will support an external ion plasma and thus prevent a large amount of energy from being dissipated in the static discharger resistance element and at the same instance providing lightning protection in the immediate region of the discharger's installation. The discharger also provides a nominal minimum of 50 db. of radiofrequency noise quieting regardless of its physical or electrical orientation to surrounding receiver antenna radiofrequency fields.

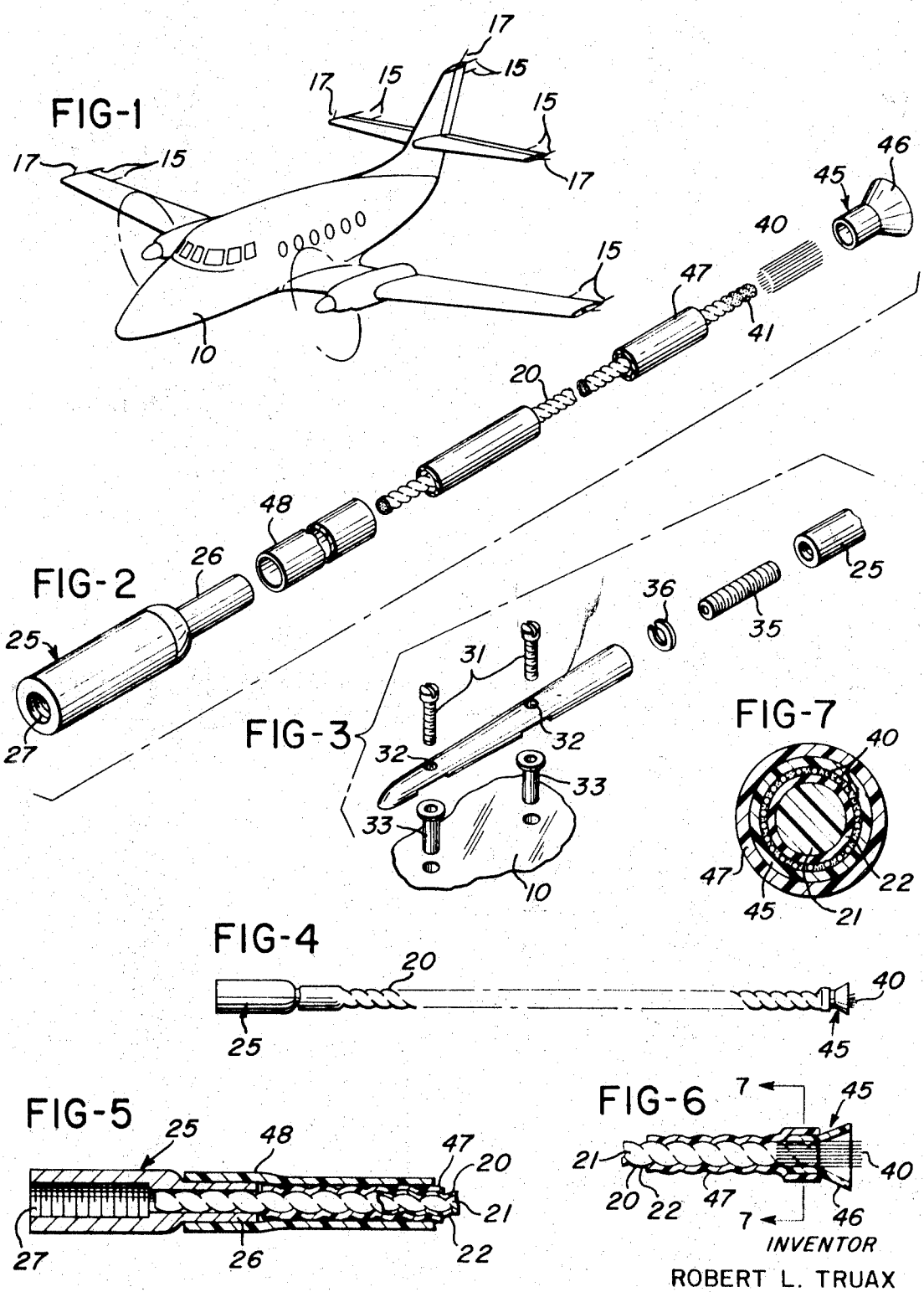

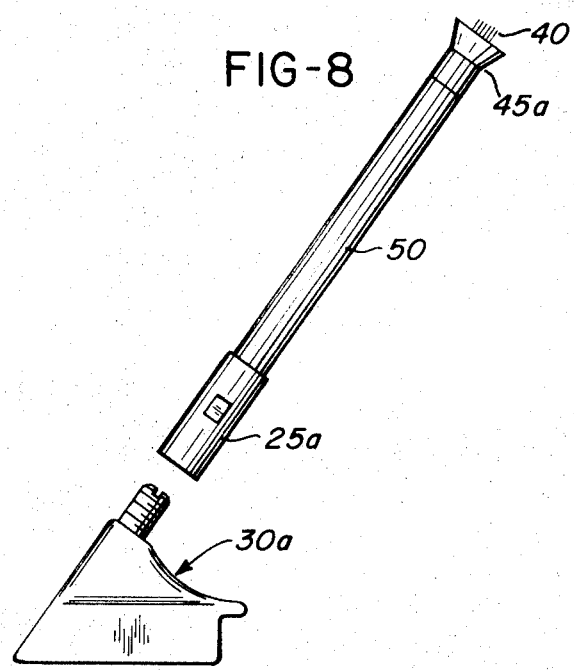
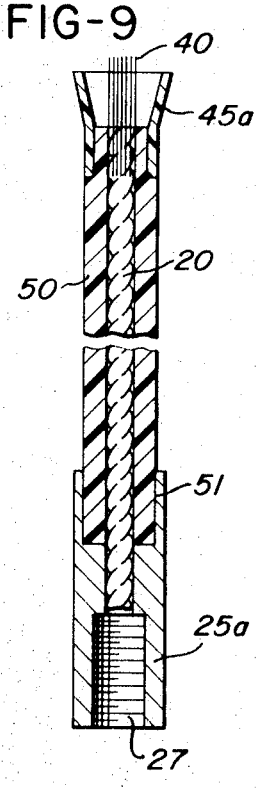
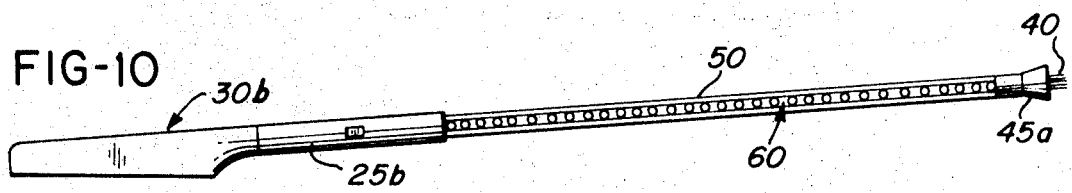
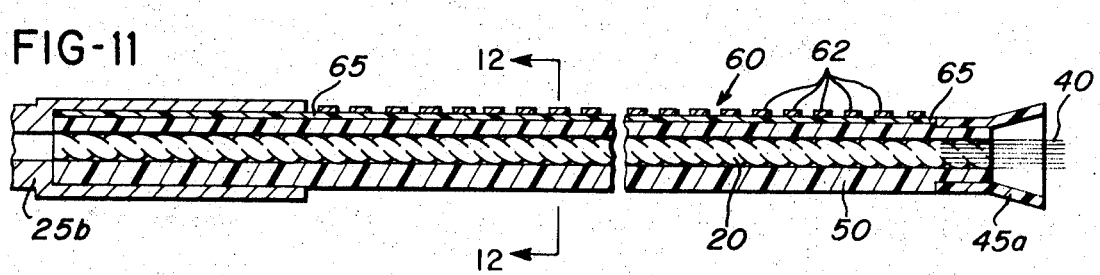
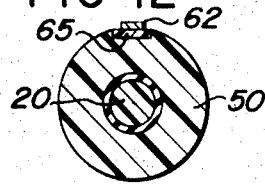

LOW-NOISE STATIC DISCHARGER DEVICE

BACKGROUND OF THE INVENTION

Aircraft and similar vehicles can acquire considerable electrostatic charges and depending upon the size of the aircraft, the nature of the existing charging mechanism, and other known factors, the aircraft charge potential may obtain a magnitude in the order of several hundred kilovolts. The total stored electrical energy is a function of aircraft capacitance and the square of the acquired voltage, and may obtain values in the order of thousands of joules. For example, tests have shown that a Boeing 707, without dischargers, will take on a charge of several hundreds of thousands of volts at charging rates of up to 10 milliamperes.

The most common and severe charging mechanism to aircraft results from flight through precipitation or other particles, such as dust. Another charging mechanism is a result of the aircraft traversing high electric fields, such as those found in the vicinity of thunder storms. A third mechanism results from the operation of the aircraft engines. As the electrical energy stored on the aircraft increases, an electric potential equal to the corona threshold at one or more locations on the aircraft may be reached. The vehicle's potential therefore rises until the corona discharge current from these locations equals the charging current and establishes an equilibrium condition. In some cases there may be a time constant lag between charging the aircraft and the corona discharge.

When corona discharge occurs directly from the aircraft or its appendages, sufficient radiofrequency energy may be generated to disrupt the radio navigation and communication systems of the aircraft. Several devices and techniques have been used to control the locations from which the corona discharge occurs and to control the electric field orientation of the radiofrequency interference relative to aircraft mounted receiving antennas.

Passive static dischargers have been found to be the most effective in preventing corona discharge from aircraft surfaces when these dischargers are installed at regions of high electrical field stresses, usually found at the extremities of the aircraft such as the outboard regions of the wings, tail surfaces, etc. These locations also tend to be regions of high electric field stress when the aircraft traverses areas where lightning attachment is possible. It is not uncommon for lightning to attach to the static dischargers, and if not protected, damage to the airframe and static dischargers might result.

SUMMARY OF THE INVENTION

This invention relates to an improved electrostatic discharge device employing a plurality of small diameter conductive discharge points resulting in lower threshold voltages needed to initiate corona discharge, higher discharge currents and lower radio frequency noise generation. The nominal 50 db. of radiofrequency noise quieting performance is achieved regardless of the discharger's orientation with respect to receiver antenna radiofrequency fields.

The static discharge device of this invention includes a resistance element having one end electrically attached to a body, such as an aircraft, on which a static charge tends to accumulate. A plurality of small conductive, preferably metallic, wires, are attached to the other end of the resistance element. These wires have essentially uniform diameters over their length, with the diameter being in the order of 10 microns or less, and a total length preferably less than one-half inch.

An electrostatic discharger constructed according to this invention will provide radiofrequency quieting which will approach or exceed the results which are obtainable under ideal conditions from carbon-impregnated cotton and nylon wick discharge devices without suffering from the problems of short life and deterioration common to such carbon wick dischargers.

One of the main attributes of a carbon wick discharger was the fact that the carbon particles were of small size and resistively isolated one from another. It is known that the amplitude of the corona discharge pulse, and consequently the radiofrequency interference energy, is directly related to the radius of the discharge point and to the electrical current in the pulse. Corona discharge results from an ion avalanche due to a high electric field in the region of the point. This avalanche results in a charged region being created about the point, having the same sign as the charge on the point, and this charged region is generally believed to occupy a volume approximating one radius of the point diameter. This ionized spheroid will quench the discharge current, and before another discharge pulse can occur, either the driving potential on the point must increase (resulting in a new pulse of higher magnitude and greater radiofrequency noise contribution), or the charged region must migrate or be swept away from the point. Usually, especially on aircraft, this charge is swept away from the discharge points by the physical flow of air over the discharger. In carbon wick dischargers, a plurality of small size points are provided and distributed over a large enough area to reduce ion space charge interaction between the points. Similarly, in this invention, a multitude of small diameter points, physically separated, are provided to distribute the ionically charged regions over a large area. Unlike the carbon wick dischargers, however, ion erosion of the points does not seriously deteriorate the effectiveness of the discharger.

In the present invention, a multiplicity of small diameter wires are used as discharge points. Ion erosion rate for a given material experimentally appears to increase as a square function of the decrease in point radius. Thus, the smaller the diameter of the wire used, the greater the number of individual wires which should be used to compensate for ion erosion.

This invention also contemplates the reduction in radiofrequency noise coupling by maintaining the individual wires at as short a length as is consistent with accepted ion erosion life expectancy. With wire having a 4-micron diameter and an overall length of about 3/16 inch, a life expectancy of over 2,000 hours at a continuous discharge rate of 50 microamperes may be expected. Radiofrequency noise coupling also depends upon each wire being physically separated from each other with each wire individually physically connected to a resistance element and thereby being electrically isolated from the remaining wires through the resistance element. This resistance interconnection of the wires results in a reduction in the effective electrical mass of the wire which results in a corresponding reduction in radiofrequency noise coupling.

The resistance element connecting the discharge wires to the body carrying the static charge must also be carefully designed so that it does not contribute to the total radiofrequency noise. In this invention, a nylon substrate is coated with a carbon-carrying resin which is carefully mixed so that intimate contact of particles is maintained throughout the length of the resistive element.

While this invention may be applied universally to any body on which a static charge tends to accumulate, its effectiveness is especially apparent on propeller driven aircraft since rotating propellers, because of the relatively sharp edges of the propellers and the low atmospheric pressure in the regions of the rotating propeller tips, have a low corona threshold. This is especially true in small aircraft where the propeller is relatively unshielded by other nearby electrically conductive masses. The corona threshold of the propeller is thus the usual limiting factor in providing corona noise protection for that type of aircraft.

Also, propeller driven aircraft tend to be physically small, and since radiofrequency field intensity declines as the square of the distance from the disturbance, noise coupling between a corona discharge and a radio antenna on small aircraft tends to be severe. This phenomena illustrates the need for low-noise static dischargers having low thresholds and high discharge current to voltage ratios. A high current to voltage ratio is required because aircraft charging is a current phenomena while corona threshold is a function of applied voltage for any given protrubance.

In the present invention, high discharge current at a given voltage is achieved by a combination of a large number of small diameter discharge points being physically separated from each other. The smaller the point, the higher the electrostatic field stress at the point resulting in corona onset at a lower potential. Ion migration velocity is relatively independent of point size, and since the ion cloud which quenches the discharge occupies a volume which is approximately one radius of the point, more frequent low-amplitude discharge pulses will occur with small points than with larger points. This results in a large net current. Experiments have shown that for the same applied electrostatic field, discharge currents from this invention are approximately twice that achieved by presently accepted industry standards.

This invention also contemplates the use of a separate lightning diverter element which has the ability to support an ion plasma on the surface of the element. It has been found that if significant current flows in the element itself, the energy dissipated is likely to be destructive to the element. In the preferred embodiment, a strip of semiconductive material extends parallel to and is isolated from the main resistance element for the static discharger by a dielectric material. A plurality of conductive terminals, each small enough to avoid significant radiofrequency coupling, may also be installed on the semiconductive strip to enhance the formation of an external ion plasma during the diversion of a lightning stroke.

Accordingly, it is an object of this invention to provide an improved electrostatic discharging element for an electrically charged body which includes a plurality of small-diameter 10 microns or less) wires of substantially uniform diameter throughout their length which are individually attached to a resistance element so that each wire is connected to the other wires and to the body through an electrical resistance; to provide an improved static discharger of the type described wherein a plurality of small constant-diameter wires are attached to a resistance element and wherein each of the wires has a length (preferably less than one-half inch) which is electrically short to reduce radiofrequency coupling with radio antennas mounted on the body; to provide a static discharger device of the type described which achieves improved radiofrequency noise quieting by a reduction of coupling to radiofrequency antennas by employing a multiplicity of small, short discharge points which are physically and electrically separated from each other by electrically resistive material; to provide a static discharger device which has uniform radiofrequency noise quieting characteristics that are independent of the discharger's orientation with respect to external radiofrequency coupling fields, threshold and corona current-carrying capacity throughout a long useful life by using a multiplicity of small-diameter points each having essentially a constant diameter and conductivity throughout their length; and to provide a static discharger device of the type described further including a lightning diverter element which is mounted separate and isolated from the static discharge element for supporting an ion plasma on the surface of the device to direct a high current impulse without damage to the static discharger device or the body to which it is attached.

Other objects and advantages of the invention will be apparent from the following description, the accompanying drawings and the appended claims.

BRIEF DESCRIPTION OF THE DRAWINGS

FIG. 1 is a perspective view of an aircraft showing typical locations on the aircraft where the static discharger device of this invention may be attached;

FIG. 2 is an exploded view, partly in section, showing the construction of one embodiment of a static discharger device constructed according to this invention;

FIG. 3 is an exploded view of mounting means for attaching one embodiment of the static discharger device to an aircraft;

FIG. 4 is an elevational view of the static discharger device shown in FIG. 2;

FIG. 5 is an enlarged cross-sectional view of the mounting end of the discharger device shown in FIGS. 2 and 4;

FIG. 6 is an enlarged cross-sectional view of the discharge end of the static discharger device of FIGS. 2 and 4;

FIG. 7 is a cross section view taken along line 7—7 in FIG. 6;

FIG. 8 is an elevational view showing another embodiment of a static discharger device constructed according to this invention:

FIG. 9 is a cross sectional view of the discharger device shown in FIG. 8;

FIG. 10 is an elevational view of a static discharger device incorporating a lightning diverter strip;

FIG. 11 is an enlarged cross-sectional view of the static discharge device including a lightning diverter strip; and FIG. 12 is a cross-sectional view taken along line 12—12 in FIG. 11.

DESCRIPTION OF THE PREFERRED EMBODIMENT

Referring now to the drawings which illustrate preferred embodiments of the invention, an aircraft 10 is depicted in FIG. 1 and is shown having installed thereon a plurality of static discharge devices 15 on the trailing edges of the wings and the tail. Also extending from the wing tips, elevator tips, and rudder are other static discharge devices 17. These discharge devices 15 and 17 are normally attached to an aircraft at those locations where electric field intensity is the highest. This serves to place the discharger in positions where they can carry the highest currents and also to prevent corona discharges from surfaces having relatively large discharge diameters which, if permitted to occur, would generate high radiofrequency noise levels.

One embodiment of a static discharger device 15 constructed according to the principles of this invention is illustrated in FIGS. 2 and 4–7. The discharger includes a resistance element 20 formed from a nylon substrate 21 having a carbon-impregnated plastic resin coating 22 formed thereon to provide a substantially uniform conductivity throughout its length. The carbon-loaded plastic has high impact strength and will adhere well to the nylon 21. Care is taken in the type of carbon and blending technique used to prevent arcing between carbon particles within the resistance element and, as a result, the carbon particles are not completely wetted during mixing with the plastic. The resistance mixture is then placed on the nylon substrate controlling the thickness of the coating, and thus its resistance. In the preferred embodiment, resistance is controlled to a value between 1 to 80 megohms over the length of the resistance element which may vary from 3 to 10 inches.

One end of the resistance element 20 is attached to a metallic fitting 25, which has a reduced end 26 adapted to receive the resistance element and internal threads 27 which are adapted to be received on a fixture mounted on the aircraft.

FIG. 3 is an exploded view of a fixture which is adapted to receive one of the static discharger devices. A mounting base 30 is attached to the aircraft 10 by screws 31 which pass through openings 32 and which are received into internally threaded rivets 33. A threaded section 35 is received into the mounting base 30, and approximately half of the threaded shaft extends outwardly from the mounting base 30 to receive the fitting 25. A lock washer 36 is usually employed to insure a secure attachment.

A plurality of electrically conductive wires 40, preferably of uniform diameter less than 10 microns, are attached by an adhesive coating 41 to the resistance element 20, as shown in FIG. 2. The wires 40 preferably are physically separated from each other with each wire individually physically connected to the resistance element and electrically connected to the remaining wires through the resistance coating.

The present invention employs a large number of individual small discharge points, and the number of wires 40 may range anywhere from 20 or less up to 10,000 or more for each discharger, and satisfactory dischargers have been made with approximately 4,000 wires in each bundle. It is obviously not practical to space such a large number of wires of 10 microns or less in diameter uniformly about the end of a resistance element 20, but it has been found that an approximation of a uniform distribution and spacing is entirely satisfactory.

Several conductive wires ranging in diameter from 0.2 to 25 microns are presently available. Some of these conductive wires are single crystal whiskers of conductive material while others are formed from nonconductive materials and are coated with a conductive material by vacuum depositing techniques or other processes. In the preferred embodiment, the wires 40 are 4 micron stainless steel fibers, type MF-A1/304, manufactured by Brunswick Corporation Technical Products Division, 69 West Washington Street, Chicago, Illinois 60602. This size conductor was chosen for the preferred embodiment for practical reasons, such as handling, availability, and cost.

A protective cap 45 surrounds the wires 40 at the end of the static discharger device. The protective cap is flanged so that, as air flows over the device, the wires 40 will tend to separate from each other. The wires 40 are thus protected from physical damage by the cap 45 and are at the same time separated from each other by airflow. The free ends of the conductors 40 are contained essentially within diverging portion 46 of the cap 45. The portion 46 also creates a region of induced turbulence and decreased air pressure in relation to the mainstream of air. This enhances the rate of plasma discharge from the individual ends of the wires 40 due to the lower threshold voltage needed for corona in a low pressure region.

A heat shrinkable plastic shield 47 covers the resistance element 20 and the reduced portion of the cap 45 to provide physical protection for the resistance coating 22 on the nylon substrate 20. The shield 47 also adds mechanical rigidity to the diverter element to lessen the whipping of the element as air moves across it. Another heat-shrinkable tube 48 covers the reduced portion 26 of the attaching fixture 25 and the protective shield 47 where it abuts the fixture 25 to provide additional mechanical rigidity.

Another embodiment of the invention is shown in FIGS. 8 and 9 and includes a resistance element 20 formed from a nylon substrate coated with a carbon-impregnated plastic resin and which has attached to one end a multiplicity of stainless steel wires 40. The other end of the resistance element 20 is received into fitting 25a, which is provided with internal threads 27 for attachment to mounting base 30a. In this embodiment, the resistance element 20 is surrounded by a rigid nylon tube 50. One end of the tube is received into an opening 51 in the fitting 25a. A protective cap 45A is mounted on the other end of the tube 50 and surrounds the metallic wires 40. The tube 50 therefore provides a mechanical support for and holds the resistance element 20 and the wires 40 rigidly in the airstream. This embodiment of the invention is particularly adapted for mounting on the tips of the wing and tail surfaces.

A lightning diverter may be included in the construction of the static discharger designed according to the principles of this invention, and one such embodiment is shown in FIGS. 10-12. The basic structure of the discharger is similar to the embodiment shown in FIGS. 8 and 9 and includes a resistance element 20 which is supported and protected by nylon tube 50 having a protective cap 45a at the right end thereof to protect a multiplicity of metallic wires 40. The nylon tube and the resistance element are received into a fitting 25b which is then attached to the aircraft mounting base member 30b.

The diverter element, shown generally at 60, may include a plurality of small aluminum conductive terminals 62 which are placed on a semiconductive strip 65. The semiconductive element 65 is a carbon- or metallic-particle-impregnated plastic material of up to about 20-mils thickness.

It is important that the diverter element 60 be able to support an ion plasma on its surface so that no significant current will flow in the semiconductive strip 65, otherwise the energy dissipated during lightning attachment may be destructive to the element itself. It is also important from a radiofrequency coupling standpoint that the semiconductive strip 65 have a high resistance and that the individual conductive terminal 62, if used, be small enough to avoid significant radiofrequency coupling.

While it is possible to use a continuous metal strip in place of the semiconductive strip 65, it has been found that noise quieting will decline from 50 db. to 30 db. when the metal strip was used. It is also possible to use the resistance element 20 as the conductive path for the discharge points 62, however, since the conductive terminals 62 contribute to radiofrequency field coupling, this arrangement would tend to degrade the noise-quieting capacity of the device. Also, a lightning attachment may destroy or degrade the resistance element 20.

In the embodiment shown in FIGS. 10-12, the conductive terminals 62 are approximately one-sixteenth inch apart, each having a thickness of approximately 5 mils. The semiconductive strip 65 is approximately 6 inches in length and has a resistance of more than 10 megohms.

Table I below illustrates the relationship between noise quieting and the diameter of the metallic fibers. Table I also illustrates the improvement in noise quieting when care is taken to resistively separate individual fibers.

TABLE I
(3/16" conductor length)

| Wire diameter (microns) | Nominal noise quieting, db (resistively separated) | Nominal noise quieting, db (not resistively separated) |
|---|---|---|
| 4 | 50 | 40 |
| 6 | 45 | 37 |
| 8 | 40 | 35 |

Table II shows the relationship between the length of the fibers at various diameters and their noise quieting ability.

TABLE II

| Wire diameter (microns) | Nominal noise quieting (in db) vs. conductor length | | | |
|---|---|---|---|---|
| | 1/8 inch | 3/16 inch | 1/4 inch | 1/2 inch |
| 4 | 55 | 50 | 45 | 40 |
| 6 | 50 | 45 | 40 | 35 |
| 8 | 45 | 40 | 35 | 30 |
| 25 | 35 | 30 | 25 | 20 |

It is apparent therefore that the shortest lengths and smallest diameters are desirable for greatest noise-quieting ability. It is also apparent, however, that the smallest diameter and shortest length wires will result in a reduced life due to the ion erosion of the fibers. Accordingly, a compromise must be reached, and for many applications, a 4-micron 3/16-inch fiber has been selected since test results indicate that a life expectancy in excess of 2000 hours at a continuous discharge current of 50 microamperes may be attained.

It is thus apparent that the small-diameter fibers effectively reduce radiofrequency noise by limiting the corona pulse amplitude and reducing the stored energy on the charged body by discharging relatively large discharge currents at low potentials, and since the metallic wires used in the discharger are of uniformly small diameter throughout their length, the ion erosion which occurs during discharge will not significantly deteriorate their noise-quieting ability but will in fact result in a slight improvement since the radiofrequency coupling will be reduced due to the shortening of the effective length of the conductor.

While the forms of static dischargers herein described constitute preferred embodiments of the invention, it is to be understood that the invention is not limited to these precise forms, and that changes may be made therein without departing from the scope of the invention which is defined in the appended claims.

What is claimed is:

1. A static discharger device adapted to be carried by a body on which a static charge tends to accumulate for discharging that static charge with a minimum of radiofrequency interference independent of its orientation with respect to surrounding radiofrequency coupling fields, said device including
   a resistance element having one end electrically attached to said body, said element having a uniform conductivity throughout its length; and
   a plurality of electrically conductive wires attached to the other end of said resistance element, said wires having a substantially constant diameter of 10 microns or less and length less than one-half inch;
   said wires being physically separated from each other with each wire individually physically connected to said resistance element and electrically connected to the remaining said wires through said resistance element;
   the diameter of said wires being substantially constant over their length so that the ends of said wires do not dull due to ionic erosion;
   the length of said wire being electrically short to minimize radiofrequency coupling and thereby minimize the noise radiated by said wires during discharge of static electricity from said wires to the atmosphere.

2. The static discharger of claim 1 further including an insulating cap surrounding said wires to provide mechanical protection thereto while exposing said wires to the atmosphere during use.

3. The static discharger of claim 1 wherein said resistance supporting element is formed from a nylon substrate having a carbon-impregnated resin coating thereon.

4. The static discharger of claim 3 further including a heat-shrinkable plastic tube covering said resistance element to protect said resistance coating from mechanical damage.

5. The static discharger of claim 1 further including a lightning diverter element which includes
   a strip of semiconductive material extending parallel to and spaced from said resistance element; and
   may have a plurality of spaced-apart conductive terminals on said semiconductive strip which are exposed to the atmosphere and which will carry all or a substantial portion of the electrical current during lightning attachment external to the discharger body thereby protecting said discharger resistance element and said wires from excessively high currents.

6. A discharge device for dissipating electrostatic charges from a moving conductive body such as aircraft skin structure which would otherwise tend to accumulate on said structure in the presence of precipitation or other electrostatic charging mechanisms, comprising an elongated body including a generally tubular outer nonconductive shield and a central resistance element, attachment means at one end of said body supporting said shield and element and further providing an electrical connection with said element for attachment to said aircraft skin structure, a multiplicity of fine conductive wires numbering in the order of 20–10,000, each being of substantially the same diameter in the order of ten microns or less and each being of approximately the same length, having inner ends substantially separated from each other and physically connected to the opposite end of said element, said wires being substantially uniformly distributed circumferentially about said element to provide electrical isolation and having free plasma discharging ends for interaction with the airstream for the dissipation of static electrical energy from said structure.

7. The device of claim 6 further comprising a circumference cap member formed in surrounding relation to said wires and having an inner end formed substantially as a continuation of said shield and an outer flared end surrounding said wire free ends for providing mechanical protection for said wires and providing a region of turbulence and low pressure during movement of said aircraft structure to assist in the removal of electrostatic field charges from the region of said wires.

8. The device of claim 6 in which said shield comprises a tubular heat-shrinkable plastic which has been shrunk into close bonding relation to said resistance element.

9. The static discharger of claim 3 wherein said resistance element is embedded in a rigid plastic body for protection.

10. The device of claim 6 wherein said resistance element is embedded in a rigid plastic body for protection.

* * * * *

Docket 5192

PO-1050
(5/69)

UNITED STATES PATENT OFFICE
CERTIFICATE OF CORRECTION

Patent No. 3,617,805   Dated November 2, 1971

Inventor(s)   Robert L. Truax

It is certified that error appears in the above-identified patent and that said Letters Patent are hereby corrected as shown below:

Column 3, line 29, first parenthesis omitted. Lines 29 and 30, should read --- ... (10 microns or less)... --.

Column 8, line 21, should read -- ends substantially physically separated from each other and --.

Signed and sealed this 2nd day of May 1972.

(SEAL)
Attest:

EDWARD M. FLETCHER, JR.   ROBERT GOTTSCHALK
Attesting Officer   Commissioner of Patents